(12) United States Patent
Srinivasamurthy et al.

(10) Patent No.: US 11,743,471 B2
(45) Date of Patent: Aug. 29, 2023

(54) METHOD AND SYSTEM TO IMPROVE THE PERFORMANCE OF A VIDEO ENCODER

(71) Applicant: Texas Instruments Incorporated, Dallas, TX (US)

(72) Inventors: Naveen Srinivasamurthy, Bangalore (IN); Manoj Koul, Bangalore (IN); Soyeb Nagori, Bangalore (IN); Peter Labaziewicz, Allen, TX (US); Kedar Chitnis, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/487,034

(22) Filed: Sep. 28, 2021

(65) Prior Publication Data

US 2022/0014756 A1    Jan. 13, 2022

Related U.S. Application Data

(60) Continuation of application No. 16/561,346, filed on Sep. 5, 2019, now Pat. No. 11,159,797, which is a
(Continued)

(30) Foreign Application Priority Data

Nov. 6, 2009    (IN) .......................... 2698/CHE/2009

(51) Int. Cl.
*H04N 19/14* (2014.01)
*H04N 19/46* (2014.01)
(Continued)

(52) U.S. Cl.
CPC ........... *H04N 19/14* (2014.11); *H04N 19/124* (2014.11); *H04N 19/137* (2014.11);
(Continued)

(58) Field of Classification Search
CPC ...... H04N 19/14; H04N 19/85; H04N 19/513; H04N 19/124; H04N 19/176; H04N 19/186; H04N 19/137; H04N 19/46; H04N 19/61
See application file for complete search history.

(56) References Cited

U.S. PATENT DOCUMENTS

| 7,075,577 B2 | 7/2006 | Tang |
| 7,684,626 B1 | 3/2010 | Cote et al. |

(Continued)

*Primary Examiner* — Lin Ye
*Assistant Examiner* — Tuan H Le
(74) *Attorney, Agent, or Firm* — Carl G. Peterson; Frank D. Cimino (57) ABSTRACT

Method and system to improve the performance of a video encoder. The method includes processing an initial video signal in a front-end image pre-processor to obtain a processed video signal and processor information respecting the signal, providing the processed video signal and the processor information to a video encoder, and encoding the video signal in the video encoder according to the processor information to provide an encoded video signal for storage. The system includes a video pre-processor connectable to receive an initial video signal. The video encoder in communication with the video pre-processor receives a processed video signal and a processor information. A storage medium in communication with the video encoder stores an encoded video signal.

20 Claims, 4 Drawing Sheets

Related U.S. Application Data continuation of application No. 15/294,389, filed on Oct. 14, 2016, now Pat. No. 10,448,022, which is a division of application No. 12/940,046, filed on Nov. 5, 2010, now Pat. No. 9,473,792.

(51) Int. Cl.

| | | |
|---|---|---|
| *H04N 19/513* | (2014.01) | |
| *H04N 19/61* | (2014.01) | |
| *H04N 19/137* | (2014.01) | |
| *H04N 19/85* | (2014.01) | |
| *H04N 19/124* | (2014.01) | |
| *H04N 19/176* | (2014.01) | |
| *H04N 19/186* | (2014.01) | |

(52) U.S. Cl.
CPC ......... *H04N 19/176* (2014.11); *H04N 19/186* (2014.11); *H04N 19/46* (2014.11); *H04N 19/513* (2014.11); *H04N 19/61* (2014.11); *H04N 19/85* (2014.11)

(56) References Cited

U.S. PATENT DOCUMENTS

| | | |
|---|---|---|
| 9,473,792 B2 | 10/2016 | Srinivasamurthy et al. |
| 11,159,797 B2 * | 10/2021 | Srinivasamurthy .... H04N 19/46 |
| 2003/0044078 A1 | 3/2003 | Joshi et al. |
| 2003/0231796 A1 | 12/2003 | Caviedes |
| 2005/0031201 A1 | 2/2005 | Goh |
| 2005/0164979 A1 | 7/2005 | Gross et al. |
| 2005/0268990 A1 | 12/2005 | Chin et al. |
| 2006/0198627 A1 | 9/2006 | So |
| 2006/0210156 A1 | 9/2006 | Lei |
| 2009/0010559 A1 | 1/2009 | Inagaki |
| 2009/0040347 A1 | 2/2009 | Uehara et al. |
| 2009/0122159 A1 | 5/2009 | Sakaue et al. |
| 2009/0199230 A1 | 8/2009 | Kumar |
| 2009/0208106 A1 | 8/2009 | Dunlop et al. |
| 2009/0297054 A1 | 12/2009 | Regunathan |
| 2010/0014590 A1 | 1/2010 | Smith |
| 2010/0091113 A1 | 4/2010 | Morioka |
| 2010/0097491 A1 | 4/2010 | Farina |
| 2010/0183071 A1 | 7/2010 | Segall |
| 2011/0109753 A1 | 5/2011 | Srinivasamurthy |
| 2017/0034516 A1 | 2/2017 | Srinivasamurthy |

* cited by examiner

FIG. 3b $$\begin{bmatrix} 16, 18, 20, 23, \\ 18, 20, 23, 27, \\ 20, 23, 27, 30, \\ 23, 27, 30, 32 \end{bmatrix}$$

FIG. 4a $$\begin{bmatrix} 16, 17, 18, 19, 20, 21, 22, 24 \\ 17, 17, 19, 20, 21, 22, 24, 25 \\ 18, 19, 20, 21, 22, 24, 25, 27 \\ 19, 20, 21, 22, 24, 25, 27, 28 \\ 20, 21, 22, 24, 25, 27, 28, 29, \\ 21, 22, 24, 25, 27, 28, 29, 30 \\ 22, 24, 25, 27, 28, 29, 30, 31 \\ 24, 25, 27, 28, 29, 30, 31, 32 \end{bmatrix}$$

FIG. 4b $$\begin{bmatrix} 12, 26, 40, 56, \\ 26, 40, 56, 64, \\ 40, 56, 64, 74, \\ 56, 64, 74, 84 \end{bmatrix}$$

FIG. 4c $$\begin{bmatrix} 12, 20, 26, 32, 36, 46, 50, 54 \\ 20, 22, 32, 36, 46, 50, 54, 58 \\ 26, 32, 36, 46, 50, 54, 58, 62 \\ 32, 36, 46, 50, 54, 58, 62, 66 \\ 36, 46, 50, 54, 58, 62, 66, 72, \\ 46, 50, 54, 58, 62, 66, 72, 76 \\ 50, 54, 58, 62, 66, 72, 76, 80 \\ 54, 58, 62, 66, 72, 76, 80, 84 \end{bmatrix}$$

FIG. 4d $$\begin{bmatrix} 20, 28, 40, 48, \\ 28, 40, 48, 54, \\ 40, 48, 54, 60, \\ 48, 54, 60, 68 \end{bmatrix}$$

FIG. 4e $$\begin{bmatrix} 18, 26, 30, 34, 38, 42, 44, 48 \\ 26, 26, 34, 38, 42, 44, 48, 50 \\ 30, 34, 38, 42, 44, 48, 50, 52 \\ 34, 38, 42, 44, 48, 50, 52, 56 \\ 38, 42, 44, 48, 50, 52, 56, 60, \\ 42, 44, 48, 50, 52, 56, 60, 64 \\ 44, 48, 50, 52, 56, 60, 64, 66 \\ 48, 50, 52, 56, 60, 64, 66, 70 \end{bmatrix}$$

METHOD AND SYSTEM TO IMPROVE THE PERFORMANCE OF A VIDEO ENCODER

This application is a continuation of U.S. patent application Ser. No. 16/561,346, filed Sep. 5, 2019, which is a continuation of U.S. patent application Ser. No. 15/294,389, filed Oct. 14, 2016 (now U.S. Pat. No. 10,448,022), which is a divisional of U.S. patent application Ser. No. 12/940,046, filed Nov. 5, 2010 (now U.S. Pat. No. 9,473,792), which claims priority from India Provisional Application Serial No. 2698/CHE/2009 filed Nov. 6, 2009, all of which are incorporated herein by reference in their entireties.

TECHNICAL FIELD

Embodiments of the disclosure relate to the field of perceptual quality enhancement in a video processing system.

BACKGROUND

In a video processing system, a video encoder receives an input video sequence and encodes the video sequence using standard video encoding algorithms such as H.263, H.264 or various algorithms developed by Moving Picture Experts Group (MPEG). Such video sequences are highly non-homogeneous, consisting for example of scene changes, variations in motion, and varying complexity within a frame and between different frames. The non-homogeneous nature of the video sequence makes the task of encoding for the video encoder difficult resulting in a need for more processing cycles per frame. Increased complexity in encoding of the video sequences also results in high power consumption.

SUMMARY

An example of a method of encoding a video signal includes processing an initial video signal in a front-end image pre-processor to obtain a processed video signal. The method also includes obtaining, from the pre-processor, processor information respecting the processed video signal. The processed video signal and the processor information are provided to a video encoder. The video signal is encoded in the video encoder according to the processor information to provide an encoded video signal for storage.

An example of a video system includes a video pre-processor connectable to receive an initial video signal. A video encoder in communication with the video pre-processor receives a processed video signal and a processor information. A storage medium in communication with the video encoder stores an encoded video signal.

DETAILED DESCRIPTION

Figure 1:
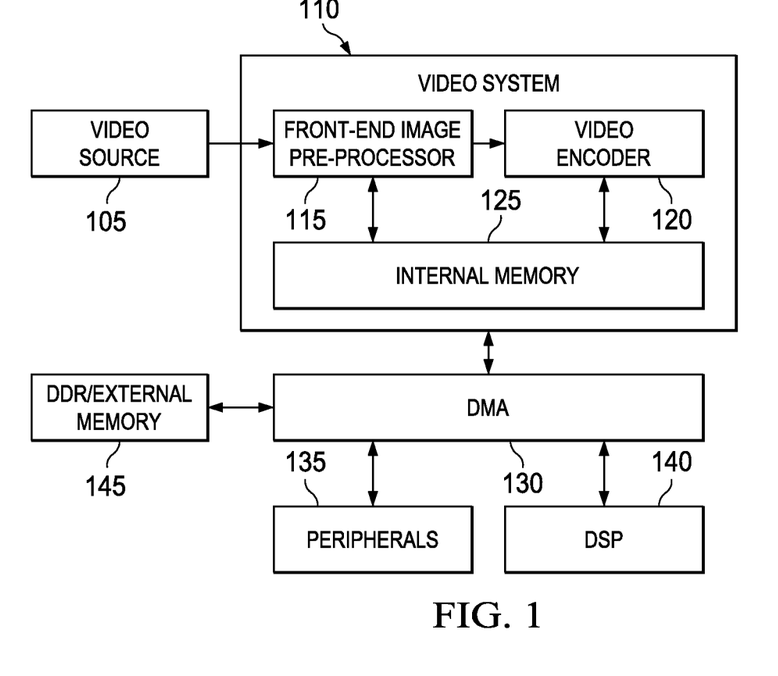
FIG. 1 is a block diagram illustrating an environment, in accordance with which various embodiments can be implemented.

FIG. 1 is a block diagram illustrating an environment, in accordance with which various embodiments can be implemented. The environment includes a video source 105. The video source 105 generates a video sequence. The video sequence is fed to a video system 110 for further processing. In an embodiment, the video source 105 is typically the CCD/CMOS sensor at the front-end of a camera. Examples of the video source 105 also include, but are not limited to, a playback from a digital camera, a camcorder, a mobile phone, a video player, and a storage device that stores recorded videos. The video source 105 is coupled to a front-end image pre-processor 115 of the video system 110. In one embodiment, the front-end image pre-processor 115 can be external to the video system 110. The front-end image pre-processor 115 processes the input video sequence to generate information corresponding to the input video sequence by performing a plurality of operations. Examples of the operations include, but are not limited to, color interpolation to generate a complete set of RGB values for each pixel, image resizing, statistics collection for auto-focus or auto exposure or white balance, horizontal and vertical noise filtering and RGB to YUV conversion. The front-end image pre-processor 115 is coupled to a video encoder 120 within the video system 110. The video encoder 120 receives the processed video sequence and the corresponding information from the front-end image pre-processor 115 and encodes the processed video sequence. The video encoder 120 encodes the input video sequence using one of standard video encoding algorithms such as H.263, H.264, and various algorithms developed by MPEG-4. The video system 110 further includes an internal memory 125 coupled to the front-end image pre-processor 115 and the video encoder 120.

The video system 110 is coupled to a direct memory access (DMA) engine 130. The DMA 130 allows hardware subsystems to directly access an external memory/double data rate (DDR) memory 145. The DMA 130 is coupled to peripherals as represented by the block 135. Some of the peripherals include, but are not limited to, printers, loudspeakers, image scanners and webcams. The DMA 130 is also coupled to a digital signal processor (DSP) 140. The DSP 140 is a specialized microprocessor with an optimized architecture for the fast operational needs of digital signal processing. In an embodiment, the DMA can obtain the information for the video sequence from the front-end pre-processor 115 and provides to the video encoder 120.

Figure 2:
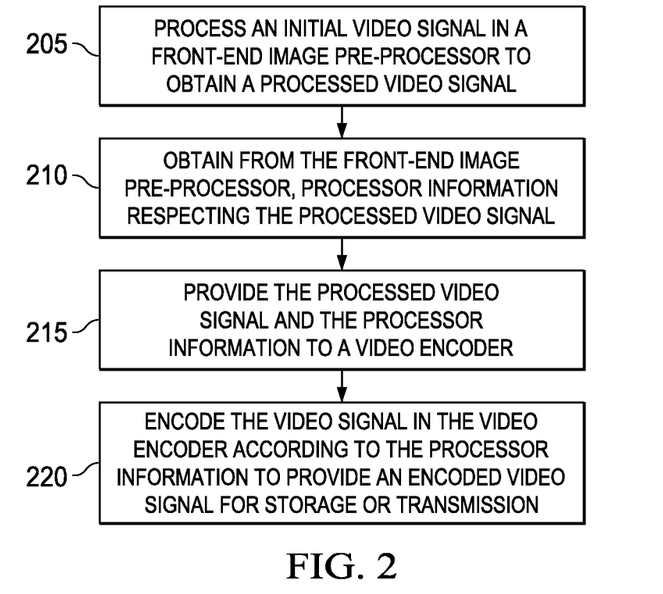
FIG. 2 is a flowchart illustrating a method for encoding a video signal, in accordance with an embodiment.

FIG. 2 is a flowchart illustrating a method for encoding a video signal, in accordance with an embodiment.

A video signal is generated by a video source, for example the video source 105, and fed as input to a front-end image pre-processor, for example the front-end image processor 115.

Alternatively, in some embodiments, the video signal fed to the front-end image pre-processor 115 can be sourced from a storage device or "a transcode signal" or a signal from a transmission system. "The transcode signal" is a signal used in the conversion of one video encoding format to another video encoding format. The video signal is transmitted to the front-end image pre-processor 115 for further processing.

At step 205, the incoming video signal is processed by the front-end image pre-processor 115 to obtain a processed video signal. The front-end image pre-processor 115 is used to perform a variety of operations on the incoming video signal. The goal of image pre-processing is to increase both the accuracy and the interpretability of the input image during the image processing phase. The image processed by the front-end image pre-processor 115 is known as a video frame. The video frame can be defined as one of the many still images that compose a moving picture. A plurality of video frames, herein also known as images, represents the video signal.

The front-end image pre-processor 115 processes the incoming video signal received from the video source 105. The processing includes extracting sharpness information from the video frame, generating a Bayer histogram, extracting automatic exposure data from the video frame, extracting camera pan, tilt and zoom information, and boundary signal calculations for the video frame.

Extraction of Sharpness Information:

The sharpness information of the video frame is extracted by the front-end image pre-processor 115 using an auto-focus algorithm. Auto-focus is used to automatically focus a camera lens onto a desired, nearby object. The auto-focus is achieved by discerning the location of the object to be photographed. The sharpness features are extracted using the auto-focus algorithm to help maximize the sharpness information for the video frame and focus the camera lens accordingly.

Bayer Histogram:

The front-end image pre-processor processes the incoming video signal to generate a Bayer histogram. A histogram is a graphical representation, showing a visual impression of the distribution of experimental data. The Bayer histogram indicates the distribution of the underlying color and luminance statistics in the video frame. The Bayer histogram builds such statistics by determining the RGB values of a pixel in the video frame. Using the RGB values of each pixel, histograms of the color/luminance pixels can be generated for the video frame.

Automatic Exposure/White Balance (AE/AWB):

The front-end image pre-processor 115 consists of an AE/AWB engine. The AE/AWB engine is used to set automatic exposure (AE) mode for a capture device as embodied by the video source 105. The AE mode enables the video source 105 to automatically calculate and adjust exposure settings for image capture. White balancing is a technique adopted in image capture, to correctly render specific colors, especially neutral colors. The specific colors are rendered by adjusting intensities of the colors within the video frame. The AE/AWB engine can be used to automatically adjust color intensities for the video frame and thus implement automatic white balance (AWB). To implement its different functions, the AE/AWB engine computes R, G and B values for different rectangular windows within a video frame.

Camera Panning and Tilting:

In one embodiment, the video source 105 includes capability to perform pan and tilt to effectively capture a video of a desired subject. Rotation of the video camera in the horizontal plane is called panning. The rotation of the video camera in the vertical plane is called tilting. The extent of camera panning and tilting is measured by an accelerometer in the video source 105. Alternately, in some applications such as a security camera, the extent of the camera panning and tilting can be inferred from the stepper motor that controls the orientation of the camera. The camera panning and tilting information can be inferred by the front-end image pre-processor 115 from the accelerometer in the video source 105.

Camera Zooming:

In one embodiment, a video source 105 has the capability to zoom the video camera to effectively capture a video of a desired object. Camera zooming is the ability of a camera to vary the focal length of its lens and thus alter the perceived view of a camera user. The video camera can zoom-in or zoom-out for the video frame. When zooming occurs, the video source 105 sets a marker for the frame that has been zoomed. Using the marker, the zooming information can be relayed to the front-end image pre-processor 115 by the video source 105.

Boundary Signal Computation (BSC)/Motion Stabilization Information:

The front-end image pre-processor 115, performs boundary signal computations (BSC) using a boundary signal calculator. The boundary signal calculator generates row summations and column summations from YCbCr 4:4:4 video format data of the video frame. Two types of vectors are generated, a vector of sum of row pixels and a vector of sum of column pixels. Both the vectors are from one of Y, Cb or Cr data. Both the vectors can be up to four or greater in number each for row sums and column sums. Y is the luma component and Cb and Cr are the blue-difference and red-difference chroma components.

The video frame is divided into different regions along the horizontal direction. For each region, a vector sum is generated by summing over the columns within the region. The division of the video frame into regions along the horizontal direction and the generation of a vector sum for each region are explained in detail in conjunction with FIG. 3a.

The video frame is divided into different regions along the vertical direction. For each region, a vector sum is generated by summing over the rows within the region. The division of the video frame into regions along the vertical direction and the generation of a vector sum for each region are explained in detail in conjunction with FIG. 3b.

Figure 3A:
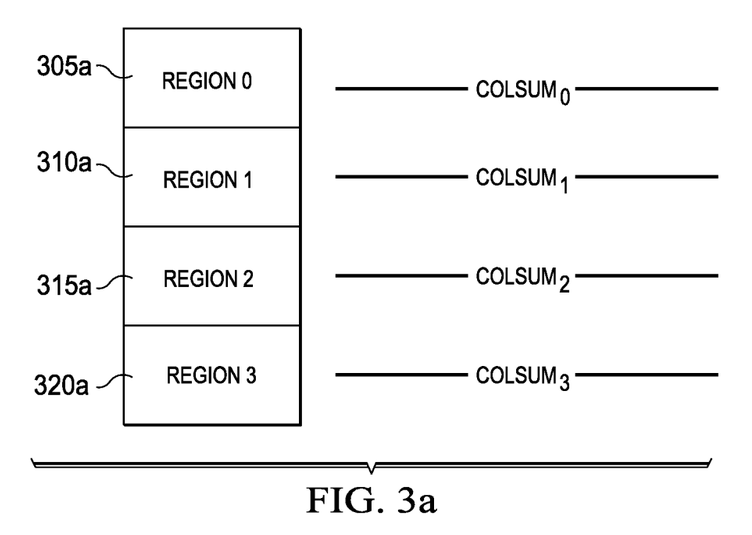
FIGS. 3a and 3b are exemplary video frames illustrating boundary signal calculations, in accordance with one embodiment.
Figure 3B:
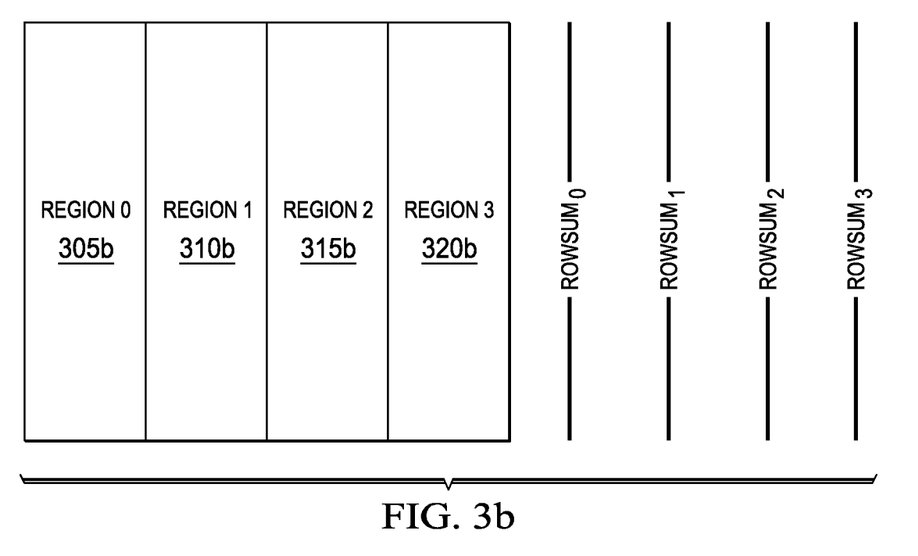

The division of the video frame into different regions in the horizontal and vertical directions breaks up the video frame into multiple Cartesian grids. Each grid has a column sum vector and a row sum vector. The row sum vector and the column sum vector of a present frame are compared with the row sum vector and the column sum vector of a previous frame and the closest match is identified. The difference in matching between the row sum vectors and the column sum vectors of a grid in the present frame, and the row sum vectors and the column sum vectors of the grid in the previous frame, gives an estimate of the motion of the grid.

At step 210, the information respecting the processed signal is obtained from the front-end image pre-processor 115. The information includes sharpness information, a Bayer histogram information, automatic exposure data, pan, tilt and zoom information, and boundary signal calculations.

At step 215, a processed video signal and the processor information is provided by the front-end image pre-processor 115 to the video encoder 120.

At step 220, the incoming video signal is encoded in the video encoder 120, according to the information provided by the front-end image pre-processor 115 to provide an encoded video signal for storage or transmission.

Video encoding is the process of preparing a video for its output where the digital video is encoded to meet file formats and specifications for recording and playback through the use of video encoder software. The video encoder 120 compresses the incoming video signal, to generate an encoded version of the incoming video signal at a lower bit rate. The video encoder 120 seeks to strike a balance between the quality of video at its output and the quantity of data that can be used to represent it, such that a viewer's experience is not compromised.

The video encoder 120 in one embodiment, utilizes the information available from the front-end image pre-processor 115. The information from the front-end image pre-processor 115 is utilized by the video encoder 120 to generate a video of better quality at its output. The information from the front-end image pre-processor 115 that is utilized by the video encoder 120 includes sharpness information, Bayer histogram information, automatic exposure (AE)/automatic white balance (AWB) information, camera panning and tilting information, camera zooming information and boundary signal computation (BSC) information.

Sharpness Information:

The sharpness information of the video frame is extracted by the front-end image pre-processor 115 using an auto-focus algorithm as explained at step 205. The sharpness information is used by the video encoder 120 to improve the quality of video at its output. The sharpness information is utilized to classify the video frame into plurality of regions. The regions are classified as a smooth region, a texture region, an edge region and a foreground and a background region.

The smooth region in the video frame is one which has very low image detail. The texture region in the video frame is one which has very high image detail. The edge region is a region in the video frame that contains sudden and large changes ("edges") in color or luminance or both.

Psycho-visual modeling technique helps in understanding how a human visual system (HVS) reacts and/or interprets different images. This technique has led to a variety of perceptual quantization schemes for video encoding. The perceptual quantization schemes exploit the masking properties of the HVS. Using the masking properties of the HVS, a quantization step size for different regions in the video frame is decided based on a perceptual importance of the different regions to the human eye.

The quantization step size is decided using a property known as texture masking. Texture masking is also known as detail dependence, spatial masking or activity masking. The texture masking property states that the discrimination threshold of the human eye increases with increasing image detail. As a result, additive and quantization noise is less pronounced in the texture regions of a video frame compared to the smooth region of the video frame. The video frame acts as a 'masker' and hides the noise (additive noise, quantization noise). The video encoder 120 uses the texture masking property of HVS to select the quantization step size for the video frame. The quantization step size is selected on the basis of the texture content in different parts of the video frame.

According to the texture masking property, the smooth region and the edge region of the video frame are much more perceptually important than the texture region. The video encoder 120 makes use of the classification of the video frame regions to appropriately control the bit budget of the different areas and maximize the overall perceptual quality. The video encoder 120 assigns more bits to the smooth region and the edge region compared to the texture region. Furthermore, the foreground region is usually assigned more bits than the background region as objects in foreground region are perceptually considered more important than compared to objects in background.

Let $Q_{base}$ be the quantization step size assigned by the video encoder 120 to the video frame. The quantization step size is increased for the texture region and reduced for the smooth region and the edge region. Furthermore, the quantization step size is reduced for the foreground area and increased for the background region. A macroblock is an image compression unit, which comprises blocks of pixels. The quantization step size for a macroblock in the video frame is given as, $$Q_{mb} = Q_{base} * \alpha * \beta \quad (1)$$

$$\text{where } \alpha = \begin{cases} \alpha_s \text{ for smooth macroblocks, } \alpha_s < 1 \\ \alpha_e \text{ for edge macroblocks, } \alpha_e < 1 \\ \alpha_t \text{ for texture macroblocks, } \alpha_t > 1 \end{cases}$$

$$\text{where } \beta = \begin{cases} \beta_f \text{ for foreground macroblocks, } \beta_f < 1 \\ \beta_b \text{ for background macroblocks, } \beta_b > 1 \end{cases}$$

The selection of quantization modulation factors $\alpha$ and $\beta$ is based on the perceptual importance of the macroblock. The quantization modulation factors $\alpha$ and $\beta$ are derived as a function of a current macroblock activity, previous frame activity, average sum of absolute differences (SAD) of the different regions and the desired quality enhancement for perceptually important regions.

A macroblock activity is the spatial activity within the macroblock. It is a measure of the texture of a macroblock, and therefore also referred to as "Texture Measure™." The macroblock activity is measured by computing the difference between consecutive rows of pixels, taking an absolute value of the difference and then adding them. The macroblock activity is also measured by computing the difference between consecutive columns of pixels, taking an absolute value of the difference and then adding them. In some embodiments, other techniques can be used for deriving macroblock activity. The macroblock activity is high for the texture region and the macroblock activity is low for the smooth region and the edge region. The macroblock activity is therefore indicative of the type of macroblock. The frame activity is the average activity of all the macroblocks within the frame.

Sum of absolute differences (SAD) is a widely used, extremely simple algorithm for finding the correlation between macroblocks. It works by taking the absolute difference between each pixel in the original block and the corresponding pixel in the block being used for comparison. These differences are summed to create a simple metric of block similarity.

The desired quality enhancement is merely a factor by which the foreground quality is enhanced when compared to the background quality.

The quantization modulation factors $\alpha$ and $\beta$ are then represented as shown below, $$\alpha = \frac{\lambda * TM + TM_{avg}}{TM + \lambda * TM_{avg}} \quad (2)$$

Where TM is the current macroblock activity and
TM$_{avg}$ is the average macroblock activity of the previous frame and
λ is a constant whose value ranges from 0 to 8;

$$\beta_f = \left( \frac{SAD_{foreground} + \frac{SAD_{background}}{\sqrt{\tau}}}{SAD_{foreground} + SAD_{background}} \right) \quad (3)$$

$$\beta_b = (\sqrt{\tau}) * \beta_f$$

where τ is the desired quality enhancement for the foreground region. The τ can be set manually, and is between 1 (no difference between foreground and background region) and 16 (foreground highly emphasized compared to background);
SAD$_{foreground}$ is the sum of absolute differences for the foreground region; and
SAD$_{background}$ is the sum of absolute differences for the background region.

In one embodiment, the incoming video signal can be encoded using a scaling matrix. The scaling matrix is used to render in greater detail the lower spatial frequencies of a macroblock and render in less detail higher spatial frequencies. This is in accordance with the behavior of the HVS, which is more sensitive to the lower spatial frequencies. The video encoding process entails transforming a macroblock of pixels into the frequency domain using a discrete-cosine transform (DCT), followed by quantization of the frequency-domain pixels. The scaling matrix is used to determine the quantization step-size applied to the frequency-domain pixels. A smaller value for an entry in the scaling matrix implies a lower (finer detail) quantization step-size and vice-versa.

The scaling matrix consists of scaling values used to modify the quantization step size of the macroblock based on the perceptual importance of the region within the macroblock. A mild scaling matrix is used for the smooth region. The scaling matrix is disabled for the edge region as the scaling matrix would smooth out the edges in the edge region. A strong scaling matrix is used for the texture region. Usage of the strong scaling matrix for the texture region ensures that too many bits are not consumed by the texture region as it is perceptually less important.

The strong scaling matrix is used for the background region and the mild scaling matrix is used for the foreground region to maximize video quality in the foreground region.

The H.264 video encoding standard allows only one scaling matrix to be used for the entire frame. The scheme of video encoding using multiple scaling matrices within a video frame is to be employed by future video encoding standards. In order to produce H.264 standard compliant encoded streams the method of using multiple scaling matrices in a single video frame is used by making use of the scaling matrices only in the forward path.

The different scaling matrices to be employed for the different regions of the video frame are explained in conjunction with FIG. 4a-4f.

The front-end image pre-processor 115 also uses the auto-focus algorithm to obtain the average value of the pixels and the average value of the square of the pixels. The standard deviation of the pixels within a macroblock can then be calculated as, $$\text{std\_dev} = \sum_{i=0}^{n} (x_i - \bar{x})^2 = \sum_{i=0}^{n} x_i^2 - \bar{x}^2 \quad (4)$$

where std_dev is the standard deviation and
$x_i$ is the $i^{th}$ value of the pixels; and
$\bar{x}$ is the average value of the pixels within the macroblock.

In a reduced power consumption mode when battery starts to drain on a handheld device or a mobile internet device (MID), intra-prediction mode estimation is turned off as it can be approximated with less complex algorithms that consume lesser power as compared to inter-prediction. The standard deviation is used when performing mode decision in this case.

The intra-prediction and the inter-prediction are two modes of prediction used during encoding. The motion estimation is a video compression process of determining motion vectors that describe the translation from one image to another usually from adjacent frames in a video sequence. A motion vector is a vector used to represent a macroblock in a picture based on the position of the macroblock, or a similar macroblock, in a reference picture. Intra-frame prediction is a video compression technique applied to still images, such as video frames, photographs and diagrams, and exploits the redundancy within the image. As such the intra-prediction is equivalent to spatial encoding, that is, it exploits redundancies across different macroblocks of a single frame. Data redundancy is said to exist when different amounts of data are used to represent a single piece of information. Inter-frame prediction is a video compression technique applied to a sequence of video frames, rather than a single image. The inter-frame prediction exploits the similarities between successive frames to reduce the volume of data required to describe the sequence of video frames. As such inter-prediction is equivalent to temporal encoding, that is, it exploits redundancies across different frames in time.

Bayer Histogram Information:

The front-end image pre-processor 115 generates a Bayer histogram from the incoming video signal as explained at STEP 205. The Bayer histogram is used by the video encoder 120 to improve the quality of video at its output. When a scene change occurs, typically there will be a large variation in the underlying color and luminance statistics of the video frame. In order to compare the color and luminance statistics, the Bayer histogram of the color and luminance pixels can be built for every video frame. A histogram difference (HD) is a measure of the absolute bin to bin difference between the histograms of two frames. The HD can be represented as shown below, $$HD = \sum_i |hist_n(i) - hist_{n-1}(i)| \quad (5)$$

Where $hist_n$ is the Bayer histogram for frame n and
$hist_{n-1}$ is the Bayer histogram for a frame (n−1);

If the HD is greater than an adaptive threshold, then a scene change is deemed to have occurred. The threshold can be changed from frame to frame based on past frame statistics. The adaptive threshold can be defined as a function of (i) histogram distribution, i.e., mean and variance (ii) scene change detection performed by the video encoder.

Once the new scene is identified, the video encoder 120 will start a new group of pictures (GOP). Using appropriate bit allocation, the video encoder 120 will ensure that a reference picture for the new GOP will be of high quality. Using the high quality reference picture for the new GOP (after scene change), will ensure that the perceptual quality is maximized for a target bit rate.

A common problem faced in video encoding is dealing with a sudden illumination change. Fade-ins and fade-outs cause the motion prediction to fail and result in degradation of video quality at the output of the video encoder 120. The sudden illumination change can be detected by comparing the Bayer histogram between adjacent video frames. By a-priori detecting fade-ins and fade-outs, the video encoder 120 will take appropriate steps to maximize its performance and the quality of video at its output. The steps taken by the video encoder include (i) enabling all the available intra-prediction mode of motion estimation, (ii) use more complex techniques to derive more accurate weights for weighted prediction, since weighted prediction works very well for fade-ins and fade-outs. Weighted prediction is an advanced form of inter-prediction provided by the H.264 standard. In weighted prediction a weighted value of the previous video frame is subtracted from the current video frame. And finally, (iii) turn off motion estimation, thus eliminating transfers related to inter-prediction and reducing the data transfer requirements. The reduction in data transfer requirements will improve the performance of the video encoder 120 and reduce its power consumption.

The video encoder can use the Bayer histogram to derive a histogram for chroma. The histogram for chroma can then be used for chroma quantization parameter (QP) modulation using equations similar to equation (1), equation (2), equation (3) and equation (4). QP is a setting that controls the quality of video compression in MPEG-4 and H.264 video encoding standards and is similar as the quantization step size.

Automatic Exposure/White Balance (AE/AWB) Information:

The front-end image pre-processor 115 generates AE/AWB information from an AE/AWB engine as explained at Step 205. The AE/AWB engine computes RGB values for various rectangular windows within the video frame. The computed RGB values are used by the video encoder 120 for various video quality enhancements. The video quality enhancements include (i) Black Bar detection, (ii) Green signal detection and (iii) identifying complex and non-complex regions within the video frame.

The Black Bar Detection and processing: Many video sequences have black bars inserted either at the top and bottom of the video frame or at the left and right of the video frame. The black bar may be detected as an area of the image where all the R, G and B values are close to zero. Successful and correct detection of black bars can lead to elimination of annoying pulsating and chroma artifacts. An artifact is a glitch in the image or an apparent feature in the image that does not exist in reality. In order to reduce perceptual annoyance, we may (i) ensure that the quantization parameter (QP) assigned to all the macroblocks in the black bar regions are the same, and, (ii) ensure the mode of prediction assigned to all the macroblocks in the black bar region are the same. Alternatively, the macroblocks in the black bar region can be coded as skip macroblocks. A skip macroblock is a macroblock for which no information is sent to the video decoder with regard to that macroblock.

Furthermore, if it is detected that the edge region of the black bar extends only onto part of the macroblock, then for these macroblocks a 4 motion vector (MV) motion search can be selectively turned on. Motion search is a motion estimation technique where only a portion of the previous frame is examined for a matching macroblock using a search window called a motion search window. Turning on 4 MV motion search can reduce annoying distortions at black bar edges caused due to motion within the video frame. The H.264 standard employs 1 MV motion search where 1 MV is used to perform motion estimation for one macroblock. The 4 MV motion search entails dividing the macroblock into 8×8 blocks where each block has its own motion vector (MV) to perform motion estimation.

Green Signal Detection: It is an established fact that the human visual system (HVS) is much more sensitive to green signal when compared to other colors. The sensitivity to green signal is particularly true when large areas of the video frame are completely green. By detecting the areas of the video frame which are green, the video encoder 120 takes appropriate action to improve the quality of video at its output. The video encoder 120 reduces the quantization parameter (QP) for macroblocks belonging to green regions in the video frame and improves the subjective quality of video.

The Complex and non-Complex regions: The computed RGB values of the rectangular windows can be used in the determination of a non-complex region and a complex region in the video frame. To ensure that the overall perceptual quality of the video frame is maximized, more bits are usually allocated to the complex region in the video frame compared to the non-complex region in the video frame.

Detection of the complex region and the non-complex region in the video frame is performed using a derivative of intensity sensitivity of the eye. According to the Weber Fechner law, brightness sensitivity behaves non-linearly. Particularly, our sensitivity for brightness variation decreases with the increase in average brightness. The relationship between brightness and light intensity can be represented as, $$B = 116\left(\frac{L}{L_n}\right)^{\frac{1}{3}} - 16 \quad (6)$$

Where B is the perceived brightness;
L is the light intensity; and
$L_n$ is the normalization factor equal to the maximum value of L.

A technique based on the principle illustrated in equation (6) can be used to determine the allocation of the bit budget for a complex and non-complex areas of the video frame for a block based compression system. The block based compression system is one which uses macroblocks from the previous frame to construct a replica of the current frame. For each block in the current frame a matching macroblock is found in the past frame and if suitable, its motion vector is indicated for the macroblock during transmission.

For the block based compression system, the average or DC value of light intensity of a rectangular partition in the video frame and a variation of the average value of the light intensity across neighboring partitions can be computed. A partition in the video frame is a rectangular window under observation in the video frame. The partition in the video frame is explained in conjunction with FIG. 5.

The average value of the light intensity in the different partitions can be determined using the average RGB values determined by the AE/AWB engine. In one embodiment, the Bayer histogram can also be used to determine the average value of the light intensity in the different partitions. The neighbouring partitions can be utilized from the existing technique used in the H.264 standard.

The derivative of the intensity sensitivity of the eye, $L_d$, can be represented as, $$L_d = \frac{(L[x+\Delta x, y+\Delta y] - L[x, y])}{\Delta x * \Delta y} \qquad (7)$$

where, $L[x,y]$ is the intensity sensitivity at position $[x,y]$ in the video frame;
$L[x+\Delta x,y+\Delta y]$ is the intensity sensitivity at position $[x+\Delta x, y+\Delta y]$ in the video frame; and
$\Delta x$ and $\Delta y$ are pixel position difference along the x and y axis of the video frame.

The bit budget allocation method is modulated using equation (7) as a function of the rate of change of intensity sensitivity of the eye.

A high complexity region of the video frame can be defined as a region of the video frame satisfying the following two conditions (i) the rate of change of intensity sensitivity of the eye is very high and (ii) the base level of the average intensity, $L(x,y)$ is lower compared to the surrounding regions, In mathematical terms, a high-complexity region is one that satisfies the following equations:

$$L_d(HiTh) \le L_d \qquad (8)$$

where $L_d(HiTh)$ is threshold on a derivative of the intensity sensitivity of the eye, $L_d$ $$L(x, y) \le L_{x,y}(Hi) \qquad (9)$$

where, $L_{x,y}(Hi)$ is the highest intensity in the surrounding regions. i.e., a high complexity region satisfies equations (8) and (9).

A low complexity region of the video frame can be defined as a region of the video frame where (i) the rate of change of intensity sensitivity of the eye is very low and (ii) the light intensity is higher than surrounding regions. In mathematical terms, the low-complexity region is one that satisfies the following equations:

$$L_d < L_d(\text{low } Th) \qquad (10)$$

where $L_d(HiTh)$ is threshold on a derivative of the intensity sensitivity of the eye, $L_d$
and $$L(x, y) > L_{x,y}(Hi) \qquad (11)$$

where, $L_{x,y}(Hi)$ is the highest intensity in the surrounding regions. I.e., a low complexity region satisfies equations (10) and (11).

Once the high complex region and the low complexity region of the video frame are identified, the quantization step size can be appropriately modified for the high complexity region and the low complexity region of the video frame. Let $Q_{base}$ be the quantization step size assigned by the video encoder 120 to the video frame. The quantization step size for a macroblock in the video frame is then given as, $$Q_{mb} = Q_{base} * \delta \qquad (12)$$

$$\text{where } \delta = \begin{cases} \delta_l \text{ for low complexity macroblocks, } \delta_l > 1 \\ \delta_h \text{ for high complexity macroblocks, } \delta_h < 1 \end{cases}$$

The equation (12) shows that the quantization step size is increased for a low complexity macroblock and decreased for a high complexity macroblock. Perceptual video improvements are enabled by modifying the quantization step size depending on the complexity of the macroblock. The perceptual video improvements are enabled by re-allocating bits from the low complexity macroblocks and assigning them towards the high complexity macroblocks. The quantization step size modulation as indicated by equation (12) can be combined with quantization step size modulation indicated by equation (1) to give, $$Q_{mb} = Q_{base} * \alpha * \beta * \delta \qquad (13)$$

where $\alpha$ and $\beta$ are defined with respect to equation (1).

Camera Panning and Tilting Information: The extraction of camera panning and tilting information by the front-end image pre-processor 115 is explained at Step 205. The information about the direction of motion of a camera used in the video source 105 can enable the video encoder 120 to perform an improved motion search. The motion search is a process by which a rectangular pixel-block of the same size as a macroblock of the previous frame is identified as being closest to a macroblock of the current frame, for purposes of encoding. The direction of the camera motion can be inferred using the pan (left-right motion) and tilt (up-down motion) information. The center of the motion search window can be appropriately modified by taking into account the direction of the camera motion. Appropriate modification of the center of the motion search window using pan and tilt information improves perceptual video quality at the output of the video encoder 120. As a result, improved video output quality is achieved.

Consider the amount of panning as 'p' pixels and let the amount of tilting be 't' pixels. Let the motion search center window be (center_x, center_y). If panning is to the right, 'p' is positive. If panning is to the left, 'p' is negative. If tilting is in the upward direction, then 't' is negative. If tilting is in the downward direction, then 't' is positive. The new center of the motion search window using pan and tilt information is represented as, $$\text{new\_center\_x} = \text{center\_x} - p \qquad (14)$$

and $$\text{new\_center\_y} = \text{center\_y} - t \qquad (15)$$

Camera Zooming Information: The extraction of camera zooming information from the front-end image pre-processor 115 is explained at Step 205. The motion search in video encoding makes use of predictors. The predictors are used in the motion search to determine an instance of camera zooming. When a camera zooms (in or out), the position and size of the object in a reference frame will vary when compared to a current frame. When a zoom-in/out occurs, objects in the reference frame are smaller or larger compared to the object in the current frame. The zoom-in/out information can be used to scale the predictors appropriately and modify the center of the motion search window. The zoom-in/out information may also be used to select an appropriate partition size within the video frame for best viewing of the subject.

Consider the case of the camera zoom-in. If the zoom-in occurs by a factor of 'h' in a horizontal direction and by a factor 'v' in a vertical direction then, (i) divide the predictor and motion search center vector both by a factor of 'h' in the horizontal direction and a by a factor 'v' in the vertical direction, and (ii) increase bias for smaller partition size within the video frame.

If (pred_mv_x, pred_mv_y) was the predictor and zoom-in occurs by a factor 'h' in the horizontal direction and 'v' in the vertical direction, then the new predictor coordinates are represented as.

$$\text{new\_pred\_mv\_x} = \text{pred\_mv\_x} \div h \qquad (16)$$

and $$\text{new\_pred\_mv\_y} = \text{pred\_mv\_y} \div v \qquad (17)$$

Consider the case of the camera zoom-out. If the zoom-out occurs by a factor of 'h' in a horizontal direction and by a factor 'v' in a vertical direction then, (i) multiply the predictor and motion search center vector both by a factor of 'h' in the horizontal direction and a by a factor 'v' in the vertical direction, and (ii) increase bias for larger partition size within the video frame.

If (pred_mv_x, pred_mv_y) was the predictor and zoom-out occurs by a factor 'h' in the horizontal direction and 'v' in the vertical direction, then the new predictor coordinates are represented as, $$\text{new\_pred\_mv\_x} = \text{pred\_mv\_x} * h \qquad (18)$$

and $$\text{new\_pred\_mv\_y} = \text{pred\_mv\_y} * v \qquad (19)$$

Boundary Signal Computation (BSC) Information/Motion Stabilization Information: The extraction of boundary signal computation (BSC) information by the front-end image pre-processor 115 is explained at Step 205. The front-end image pre-processor 115 uses the BSC information to break up the video frame into multiple Cartesian grids and estimate the motion of each grid. The motion of the grid is estimated by comparing the row-sum and the column-sum of each grid with the grids of the previous frame in time and choosing that grid in the previous frame that is closest in value to a grid of the present frame. The BSC information is used by the video encoder 120 to estimate the motion of a grid. The motion information related to the motion of the grid can be used by the video encoder 120 to improve the perceptual quality of video at the output of the video encoder 120. The video encoder 120 can use the motion information to modify the center of the motion search window and as a predictor during motion search. The motion information helps the video encoder 120 to scale the predictor to a new value and this can be represented as, $$\text{new\_pred\_mv}[n, h] = \text{motion}_{n,h} \qquad (20)$$

where [n,h] is the grid created by using row vector sum 'n' and column vector sum 'h' and
new_pred_mv is the new predictor used in the motion search for the macroblocks in grid [n,h] and
$\text{motion}_{n,h}$ is the motion information of the grid [n,h];

In one embodiment, the video encoder 120 can feed information back to the front-end image pre-processor 115 to improve quality of a video signal fed to the video encoder 120. The video encoder 120 possesses information about the bit consumption in different parts of the video frame. The bit consumption information can be fed back to the front-end image pre-processor 115 by the video encoder 120. The front-end image pre-processor 115 uses the bit consumption information to assist the video encoder 120 to achieve better compression. The front-end image pre-processor 115 uses the bit consumption information to modify its operations such as filtering and intensity control and to improve the quality of the video signal. For example, if the front-end image processor 115 is aware of a region in the video frame consuming many bits, then the front-end image pre-processor 115 will apply stronger noise filters to the region. The application of stronger noise filters in the region consuming many bits will ensure noise in the region is heavily suppressed and quality of the video signal is improved. The video signal of better quality can be encoded better by the video encoder 120.

FIGS. 3a and 3b illustrate boundary signal calculations for an exemplary video frame in accordance with one embodiment.

FIG. 3a illustrates column sum vector calculation for the video frame. The video frame is divided into different regions of macroblocks in the horizontal direction. A region 0 of the video frame is marked as 305a. A region 1 of the video frame is marked as 310a. A region 2 of the video frame is marked as 315a. A region 3 of the video frame is marked as 320a. The different regions of the video frame have their own column sum vectors. The column sum vectors are generated by summing over the columns within the region.

The column sum vector for the region marked as 305a is indicated by $\text{colsum}_0$. The column sum vector for the region marked as 310a is indicated by $\text{colsum}_1$. The column sum vector for the region marked as 315a is indicated by $\text{colsum}_2$. The column sum vector for the region marked as 320a is indicated by $\text{colsum}_3$.

FIG. 3b illustrates row sum vector calculation.

The video frame is divided into different regions of macroblocks in the vertical direction. A region 0 of the video frame is marked as 305b. A region 1 of the video frame is marked as 310b. A region 2 of the video frame is marked as 315b. A region 3 of the video frame is marked as 320b. The different regions of the video frame have their own row sum vectors. The row sum vectors are generated by summing over the rows within the region.

The row sum vector for the region marked as 305b is indicated by $\text{rowsum}_0$. The row sum vector for the region marked as 310b is indicated by $\text{rowsum}_1$. The row sum vector for the region marked as 315b is indicated by $\text{rowsum}_2$. The row sum vector for the region marked as 320b is indicated by $\text{rowsum}_3$.

The combination of operations illustrated in FIG. 3a and FIG. 3b divides the video frame into sixteen Cartesian grids. Each grid has a row sum vector and a column sum vector. The row sum vector and the column sum vector of the present frame are compared with the row sum vector and the column sum vector of a previous frame and the closest match is identified. The difference in matching of the row sum vectors and column sum vectors of the current frame and the previous frame gives an estimation of the motion of each of the grid.

FIGS. 4a through 4f illustrate various scaling matrices to be employed for the different regions of the video frame.

The classification of the video frame into different regions using the sharpness information is as explained at Step 220 of FIG. 2. To maximize video quality at the output of the video encoder 120, the mild scaling matrix is used for the smooth region of the video frame. Also, the strong scaling matrix is used for the texture region and background region.

Figure 4A:
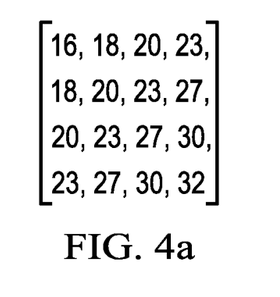
FIGS. 4a through 4f illustrate various scaling matrices, in accordance with an embodiment.

FIG. 4a is an exemplary illustration of a 4×4 mild scaling matrix used for the smooth region of the video frame. The scaling matrix consists of scaling values. This matrix is used in modifying the quantization step size of the macroblock based on the perceptual importance of the spatial frequency components within the macroblock.

The scaling values used in the mild scaling matrix differ by small numerical amounts. Consider the scaling values at the top left corner and at the bottom right corner of the 4×4 mild scaling matrix. The scaling values at the top left corner and the bottom right corner of the 4×4 mild scaling matrix have a small difference value of 16. The scaling value at the top left corner and the bottom right corner of the 4×4 mild scaling matrix represent its extremities and they have a very small difference value.

Figure 4B:
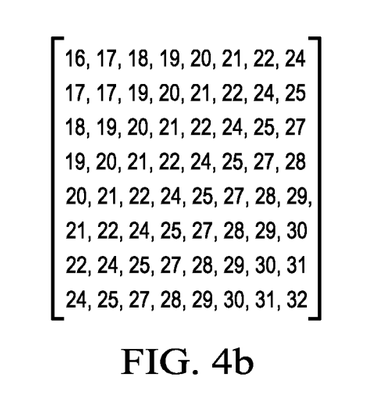

FIG. 4b is an exemplary illustration of an 8×8 mild scaling matrix used for the smooth region of the video frame.

Consider the scaling value at the top left corner and the bottom right corner of the 8×8 mild scaling matrix. The scaling values at the top left corner and the bottom right corner of the 8×8 mild scaling matrix have a small difference value of 16. The scaling value at the top left corner and the bottom right corner of the 8×8 mild scaling matrix represent its extremities and they have a very small difference value.

Figure 4C:
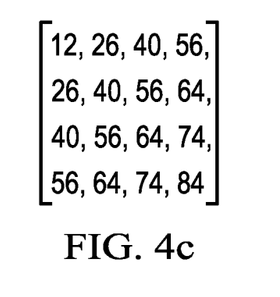

FIG. 4c is an exemplary illustration of a 4×4 strong scaling matrix for intra-macroblock coding in the texture region and the background region of the video frame.

The scaling values used in the strong scaling matrix differ by a large numerical value. Consider the scaling values at the top left corner and the bottom right corner of the 4×4 strong scaling matrix. The scaling values at the top left corner and the bottom right corner of the 4×4 strong scaling matrix have a large difference value of 72. The scaling value at the top left corner and the bottom right corner of the 4×4 strong scaling matrix represent its extremities and they have a very large difference value.

Figure 4D:
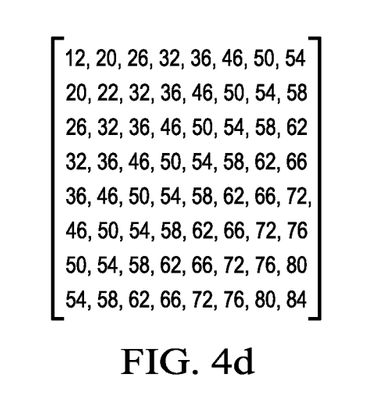

FIG. 4d is an exemplary illustration of an 8×8 strong scaling matrix for intra-macroblock coding in the texture region and the background region of the video frame.

The scaling values used in the strong scaling matrix differ by a large numerical value. Consider the scaling values at the top left corner and the bottom right corner of the 8×8 strong scaling matrix. The scaling values at the top left corner and the bottom right corner of the 8×8 strong scaling matrix have a large difference value of 72. The scaling value at the top left corner and the bottom right corner of the 8×8 strong scaling matrix represent its extremities and they have a very large difference value.

Figure 4E:
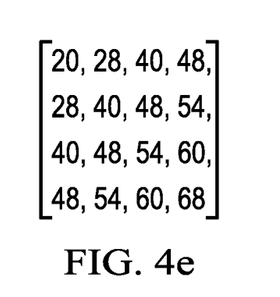

FIG. 4e is an exemplary illustration of a 4×4 strong scaling matrix for inter-macroblock coding in the texture region and the background region of the video frame.

The scaling values used in the strong scaling matrix differ by a large numerical value. Consider the scaling values at the top left corner and the bottom right corner of the 4×4 strong scaling matrix. The scaling values at the top left corner and the bottom right corner of the 4×4 strong scaling matrix have a large difference value of 48. The scaling value at the top left corner and the bottom right corner of the 4×4 strong scaling matrix represent its extremities and they have a very large difference value.

Figure 4F:
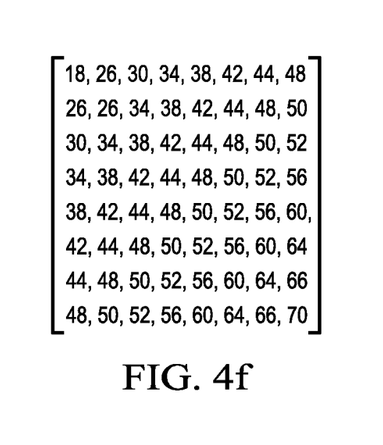

FIG. 4f is an exemplary illustration of an 8×8 strong scaling matrix for inter-macroblock coding in the texture region and the background region of the video frame.

The scaling values used in the strong scaling matrix differ by a large numerical value. Consider the scaling values at the top left corner and the bottom right corner of the 8×8 strong scaling matrix. The scaling values at the top left corner and the bottom right corner of the 8×8 strong scaling matrix have a large difference value of 52. The scaling value at the top left corner and the bottom right corner of the 8×8 strong scaling matrix represent its extremities and they have a very large difference value. In some embodiments, the difference in scaling values is comparatively lesser in inter macroblock coding than in intra macroblock coding.

Figure 5:
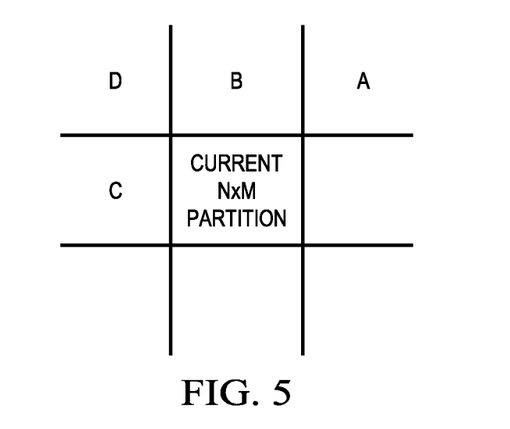
FIG. 5 is an exemplary illustration of a partitioned video frame.

FIG. 5 is an exemplary illustration of a partitioned video frame.

The partitioned video frame has different partitions each of dimension N×M where N represents the number of rows of pixels in the partition and M represents the number of columns of pixels in the partition. The different partitions in the partitioned video frame include the partitions labeled A, B, C and D. A fifth partition is also labeled which is the partition currently under computation to determine its RGB values. The partitioned video frame is used by an AE/AWB engine in the front-end image pre-processor 115 to compute average RGB values, and variation across partitions in the RGB values, for a selected partition of the video frame as explained at Step 220 of FIG. 2. An average value of intensity is determined using the computed RGB values. In one embodiment, a Bayer histogram can also be used to determine the average value of the light intensity in the different partitions. Using the average value of light intensity, a bit allocation technique for the video frame is implemented. The bit allocation technique is explained in detail in step 220 of FIG. 2.

Information available in the front-end processors are useful in handling scene changes in a video signal, identifying artifacts in the video signal, identifying motion changes in video signal, identifying zoom, pan and tilt, and enhancing perceptual quality of the video signal. The use of the information by video encoder helps in improved encoded video quality, improved performance and robustness of the video encoders. In some embodiments, the usage of information allows operability of the video encoders in reduced power mode in hand held devices.

In the foregoing discussion, each of the terms "coupled" and "connected" refers to either a direct electrical connection or mechanical connection between the devices connected or an indirect connection through intermediary devices.

The foregoing description sets forth numerous specific details to convey a thorough understanding of embodiments of the disclosure. However, it will be apparent to one skilled in the art that embodiments of the disclosure may be practiced without these specific details. Some well-known features are not described in detail in order to obscuring the disclosure. Other variations and embodiments are possible in light of above teachings, and it is thus intended that the scope of disclosure not be limited by this Detailed Description, but only by the Claims.

What is claimed is:

1. A method of encoding a video signal including a frame, the method comprising:
generating, by a pre-processor circuit, a Bayer histogram from the video signal;
deriving, by an encoder coupled to the pre-processor circuit, a chroma histogram from the Bayer histogram;
modifying, by the encoder, a chroma quantization step size for the frame based on the chroma histogram.

2. The method as in claim 1 and further comprising:
encoding, by the encoder, the frame using the modified chroma quantization step size.

3. The method as in claim 1, further comprising modifying a second quantization step size based on automatic exposure data.

4. The method as in claim 1, further comprising modifying a second quantization step size based on pan, tilt, and zoom information of a video capturing device.

5. The method as in claim 4, wherein processing of the video signal is performed by the pre-processor circuit in communication with the video capturing device.

6. The method as in claim 1, further comprising modifying a second quantization step size based on motion stabilization information.

7. The method as in claim 1, further comprising initiating, by the encoder, a new group of pictures for encoding based on the Bayer histogram.

8. The method as in claim 1, and further comprising:
detecting black bar areas in the frame; and
assigning a single quantization step size for macroblocks representing the black bar areas in the frame.

9. The method as in claim 1, and further comprising:
determining average RGB values for the frame;
detecting green regions in the frame using the average RGB values; and
reducing the chroma quantization step size for macroblocks representing the green regions in the frame.

10. A video system comprising:
a video pre-processor configured to generate a Bayer histogram from a video signal, wherein the video signal includes a frame;
a video encoder coupled to the video pre-processor; and
a non-transitory computer readable storage medium storing a program for execution by the video encoder, wherein the program includes instructions to:
derive a chroma histogram from the Bayer histogram; and
modify a chroma quantization step size for the frame based on the chroma histogram.

11. The video system as in claim 10, wherein the program further includes instructions to modify a second quantization step size based on automatic exposure data.

12. The video system as in claim 10, wherein the program further includes instructions to modify a second quantization step size based on pan, tilt, and zoom information of a video capturing device.

13. The video system as in claim 10, wherein the program further includes instructions to initiate a new group of pictures for encoding based on the Bayer histogram.

14. The method as in claim 1,
wherein the frame is a first frame,
wherein the Bayer histogram is a first Bayer histogram for the first frame,
wherein the method further comprises:
generating a second Bayer histogram for a second frame in the video signal; and
determining a histogram difference between the first Bayer histogram and the second Bayer histogram,
wherein modifying the chroma quantization step size is based on the histogram difference.

15. The method as in claim 1, further comprising determining an average value of light intensity based on the Bayer histogram.

16. The video system as in claim 10,
wherein the frame is a first frame,
wherein the Bayer histogram is a first Bayer histogram for the first frame,
wherein the program further includes instructions to:
generate a second Bayer histogram for a second frame in the video signal; and
determine a histogram difference between the first Bayer histogram and the second Bayer histogram,
wherein the instructions to modify the chroma quantization step size comprises instructions to modify the chroma quantization step size based on the histogram difference.

17. The video system as in claim 10, wherein the program further includes instructions to determine an average value of light intensity based on the Bayer histogram.

18. The video system as in claim 10, wherein the program further includes instructions to encode the frame using the modified chroma quantization step size.

19. The video system as in claim 10, wherein the program further includes instructions to modify a second quantization step size based on motion stabilization information.

20. The video system as in claim 10, wherein the program further includes instructions to:
determine average RGB values for the frame;
detect green regions in the frame using the average RGB values; and
reduce the chroma quantization step size for macroblocks representing the green regions in the frame.

* * * * *